United States Patent
Wortberg et al.

(10) Patent No.: US 9,755,418 B2
(45) Date of Patent: Sep. 5, 2017

(54) FUSE PROTECTION FOR A LINE

(71) Applicant: Lisa Draexlmaier GmbH, Vilsbiburg (DE)

(72) Inventors: Michael Wortberg, Dorfen (DE); Alfred Kerber, Moosthenning (DE); Erwin Lichtenberg, Vilsbiburg (DE); Jan Marquardt, Landshut (DE); Gernot Eyssler, Altfraunhofen (DE); Anton Bachmeier, Kumhausen (DE)

(73) Assignee: Lisa Draexlmaier GmbH, Vilsbiburg (DE)

(*) Notice: Subject to any disclaimer, the term of this patent is extended or adjusted under 35 U.S.C. 154(b) by 186 days.

(21) Appl. No.: 14/822,659

(22) Filed: Aug. 10, 2015

(65) Prior Publication Data
US 2016/0043537 A1    Feb. 11, 2016

(30) Foreign Application Priority Data
Aug. 11, 2014 (DE) .......... 10 2014 111 416

(51) Int. Cl.
| | |
|---|---|
| *H02H 3/00* | (2006.01) |
| *H02H 9/08* | (2006.01) |
| *H02H 3/08* | (2006.01) |
| *H02H 3/087* | (2006.01) |
| *H02H 1/00* | (2006.01) |
| *H02H 3/30* | (2006.01) |

(52) U.S. Cl.
CPC ............. *H02H 3/08* (2013.01); *H02H 3/087* (2013.01); *H02H 1/0007* (2013.01); *H02H 1/0038* (2013.01); *H02H 3/305* (2013.01)

(58) Field of Classification Search
CPC ....................................................... H02H 3/08
USPC ............................................................ 361/42
See application file for complete search history.

(56) References Cited

U.S. PATENT DOCUMENTS

| | | | |
|---|---|---|---|
| 7,372,238 B1* | 5/2008 | Tomiyoshi .......... | H02M 3/1588 323/224 |
| 8,275,559 B2* | 9/2012 | Rene ....................... | H04M 3/10 324/509 |

(Continued)

FOREIGN PATENT DOCUMENTS

| | | |
|---|---|---|
| DE | 19850397 A1 | 5/2000 |
| DE | 102006021774 A1 | 1/2007 |

OTHER PUBLICATIONS

Office Action of the Intellectual Property Office of Germany in German Patent Application No. PI0242014, dated Apr. 7, 2015, 10 pages.

*Primary Examiner* — Thienvu Tran
*Assistant Examiner* — Lucy Thomas
(74) *Attorney, Agent, or Firm* — Finnegan, Henderson, Farabow, Garrett & Dunner LLP

(57) ABSTRACT

A device and method for fuse protection of a line includes at least two sensors for sensing a corresponding electric variable in a first location and a second location along a conductor line, and for outputting a corresponding first value and second value of the electric variable at the first and second locations, respectively. An evaluation unit evaluates the generated first and second values in order to generate an evaluation result. The evaluation unit controls, based on the evaluation result, an isolating element to cause the isolating element to interrupt a current flow in the conductor line.

15 Claims, 9 Drawing Sheets

(56) References Cited

U.S. PATENT DOCUMENTS

2014/0139213 A1* 5/2014 Cadugan ............ G01R 33/0023
324/251
2014/0347024 A1* 11/2014 Rozman .................. H02M 1/00
323/282

* cited by examiner

FUSE PROTECTION FOR A LINE

CROSS-REFERENCE TO RELATED APPLICATION

This application is based upon and claims the benefit of prior German Application No. 10 2014 111 416.7, filed on Aug. 11, 2014, the entire contents of which are incorporated herein by reference.

TECHNICAL FIELD

The present disclosure relates to a device for fuse protection of a line. The present disclosure further relates to a method for fuse protection of a line.

BACKGROUND OF THE DISCLOSURE

Parallel arcs can develop in an on-board electric system in a vehicle having an operating voltage of 24V or 48V, for example; on the one hand, these arcs limit the current so that a fusible cutout is not triggered, but on the other hand, they can cause a fire in the vehicle.

Furthermore, a serial arc that cannot be protected by a fusible cutout due to resulting current, which is lower than the load current, may develop if a cable break occurs in the on-board electric system. Such a serial arc can also cause a fire.

It is known that additional lines (e.g., measurement lines, e.g., in the form of a shielding) may be provided and coupled to an electronic evaluation system that detects a change in resistance or potential. One disadvantage here is that additional lines are expensive. Furthermore, a measurement line connected to a useful line may be difficult and complicated to contact; this can result in expensive plugs, for example. Disturbances on the measurement line may have effects that additionally reduce the reliability of the evaluation and/or make the electronic evaluation system more expensive due to additional measures such as filters, for example. This can also result in taking too long of a time to detect short circuits.

SUMMARY

Embodiments of the present disclosure may avoid the disadvantages mentioned above and provide a solution for a rapid and reliable shutdown in the event of a fault. In the event of a parallel and/or serial arc for example, a single line or a collective line can be reliably isolated from the power supply voltage. This may be achieved by a device and method for fuse protection of a line. According to this disclosure, there is provided a device for fuse protection of a line having at least one sensor on the basis of which an electric variable can be determined in at least two locations on a line, and having an evaluation unit, on the basis of which the electric variables can be evaluated, wherein the evaluation unit may be set up to control the isolating element as a function of the result of an evaluation, so that it interrupts a current flow in the line. Thus, the evaluation unit may control, based on the evaluation result, an isolating element to interrupt a current flow in a conductor line.

The electric variables may include, for example, a current, a voltage, or a magnetic field (for example, magnetic flux density). The sensor may output one electric variable or a plurality of electric variables. Values of electric variables may be output. One electric variable may be supplied by the sensor per location on the line. It is also possible that one individual sensor determines the electric variable(s) in two locations on the line; for example, a magnetic field may be determined by means of a single sensor in two locations on the line which are near one another. As another example, at least two sensors may sense a corresponding electric variable in a first location and a second location along a conductor line, and may output a corresponding first value and second value of the electric variable at the first and second locations, respectively.

The isolating element may be a contactor or a relay, or a fuse, for example. The isolating element can also be controlled by the evaluation unit, which may be an evaluation circuit. In this way, the electric circuit can be interrupted by the isolating element via the evaluation circuit. For example, the device can be set up so that the isolating element is opened in the currentless state of the evaluation unit.

It is a further aspect of the disclosure that the line may be a power supply line between a battery and at least one load.

It is another aspect of the disclosure that the at least two locations may be near one another.

For example, the two locations may be locations on a line that represent connecting lines to and/or from a load, and they may be arranged nearby, so that a magnetic field or a change in magnetic field induced by the connecting lines can be detected by means of a sensor, for example. The means of a sensor may, for example, be a single sensor.

It is a further aspect of the disclosure that the sensor may include a resistor in the line, wherein a voltage on the resistor can be evaluated by the evaluation unit.

It is also a further aspect of the disclosure that the sensor may comprise a Hall sensor, wherein a Hall voltage can be evaluated by the evaluation unit.

Furthermore, it is another aspect of the disclosure that the sensor may comprise at least one giant magnetoresistance (GMR) sensor.

In an additional aspect of the disclosure, the sensor may comprise a bridge circuit having at least one GMR sensor, and may be a full bridge circuit having two GMR sensors.

A next aspect of the includes that the sensor may be mechanically connected to the line.

For example, the sensor may be arranged on a circuit board (for example, a flexible circuit board), which may be mechanically connected to the line.

In some embodiments, a comparison comprising at least one formation of a difference can be performed on the basis of the evaluation.

For example, there may be at least one comparison of at least two electric variables with one another and/or with at least one predefined threshold value, for example.

Some embodiments may include setting up the evaluation unit, so that two measured electric variables may be compared in a first comparison, and the result of the evaluation may be determined by comparing the result of the first comparison with a predefined threshold value in a second comparison.

For example, the isolating element may be opened if the result of the first comparison yields an indication of a current that is higher than the predefined threshold value. The isolating element may remain closed if the current is lower than the predefined threshold value.

For example, the evaluation unit can also compare the electric variable(s) with at least one predefined threshold value and can trigger the isolating element based on the evaluation result obtained in this way.

In some embodiments, the electric variable may be a voltage, a current, or a power, or may be based on a magnetic variable.

In some embodiments one sensor may be provided in each power supply line and in each ground line.

According to this disclosure, there is also provided a method for fuse protection of a line, in which an electric variable may be determined in at least two locations on a line by means of at least one sensor, the electric variables thereby determined may then be evaluated and an isolating element may be triggered as a function of the result of an evaluation, so that the isolating element interrupts a current flow in the line.

A further aspect of the disclosure may include comparing two measured electric variables with one another in a first comparison, and determining the result of the evaluation by comparing, in a second comparison, the result of the first comparison with a predefined threshold value.

In some embodiments, the isolating element may be opened if the result of the first comparison is greater and/or less than the predefined threshold value.

In some embodiments, the result of the evaluation may be determined based on two electric variables or on chronologically successive values of an electric variable.

It is therefore possible that an evaluation may be based on two electric variables, e.g., voltages or currents occurring almost simultaneously. Alternatively (or additionally), the evaluation may be based on a change in at least one electric variable (e.g., voltage, current, magnetic field) over time. In both cases, a threshold value comparison may be performed, for example, and the isolating element can be opened on reaching and/or exceeding, or even falling below the threshold value.

A fuse device comprising at least one of the devices described here is also provided to achieve that described in this disclosure.

Said fuse device may also be interpreted as a fuse system.

In the context of an aspect of this disclosure, the fuse device can be used in an operating network, such as in an on-board electric system, for example a 48V on-board electric system, in a motor vehicle.

The approach presented in this disclosure also includes a computer program product, which can be loaded directly into a memory in a digital computer and may comprise program code parts suitable for performing steps of the methods described.

The evaluation unit may be embodied as a processor unit and/or an at least partially hardwired or logic circuit configuration, which may be set up so that, for example, the method can be performed as described herein. Said evaluation unit may be or may comprise any type of processor or computer having the required peripherals (memory, input/output interfaces, input/output devices, etc.) accordingly.

The explanations given pertaining to methods may also apply to the devices accordingly and vice versa. The devices may be embodied in one component or distributed among multiple components.

The properties, features and advantages as described above as well as the type and manner of how they are achieved can be understood more clearly and more distinctly in conjunction with the following schematic description of embodiments, which are explained in greater detail in conjunction with the drawings. For the sake of simplicity, the same elements or those having the same effect may be provided with the same reference numerals.

BRIEF DESCRIPTION OF THE FIGURES

Further details and advantages of the embodiments will be described hereafter with reference to the figures.

DETAILED DESCRIPTION

Currents occurring on a feeder line from a power supply to a load, for example, often cannot be differentiated clearly with regard to a fault current or a current during normal operation. Some disturbances may therefore remain undetected and cannot lead to triggering of a fuse, for example a fusible cutout. One example of such a disturbance is a parallel arc, for example, a parallel short circuit, which leads to a limited but unwanted current flow.

It is proposed that an electric variable, for example, a current and/or a voltage, may be determined in at least two locations or points on a line and evaluated. The at least two locations may be a distance apart from one another or near to one another. Different sensors may be used to determine the electric variable. It is possible that at least one measuring bridge may be used to determine the electric variable. An evaluation unit may comprise, for example, a comparison of the electric variables determined. For example, an isolating element, such as a contactor or a relay, may be controlled by the evaluation unit so that it is interrupted when a fault current of the electric circuit is detected, for example, between a power source and a load.

A giant magnetoresistance (GMR) sensor, magnetic field sensor, or Hall sensor which may be based on the Hall effect for measuring magnetic fields, may be used to determine the electric variable, for example. The GMR sensor, which may also referred to as a GMR element, may be used in a bridge circuit with ohmic resistors, for example.

A so-called giant magnetoresistance (GMR) effect may be observed in structures consisting of alternating magnetic and nonmagnetic thin layers with a layer thickness of a few nanometers. This effect may cause the electric resistance of the structure to depend on the mutual orientation of the magnetization of the magnetic layers and may be much higher with magnetization in opposite directions than with magnetization in the same direction.

A temperature compensation may optionally take place.

The approach proposed here can be used in existing systems, including their lines and/or their plug systems.

Such a parallel short circuit can be detected by the comparison of the electric variable determined in various locations, for example, in the form of a calculated difference. This approach may not require any additional lines (e.g., with multiple shielding or measurement lines), which may facilitate use in existing systems.

Figure 1:
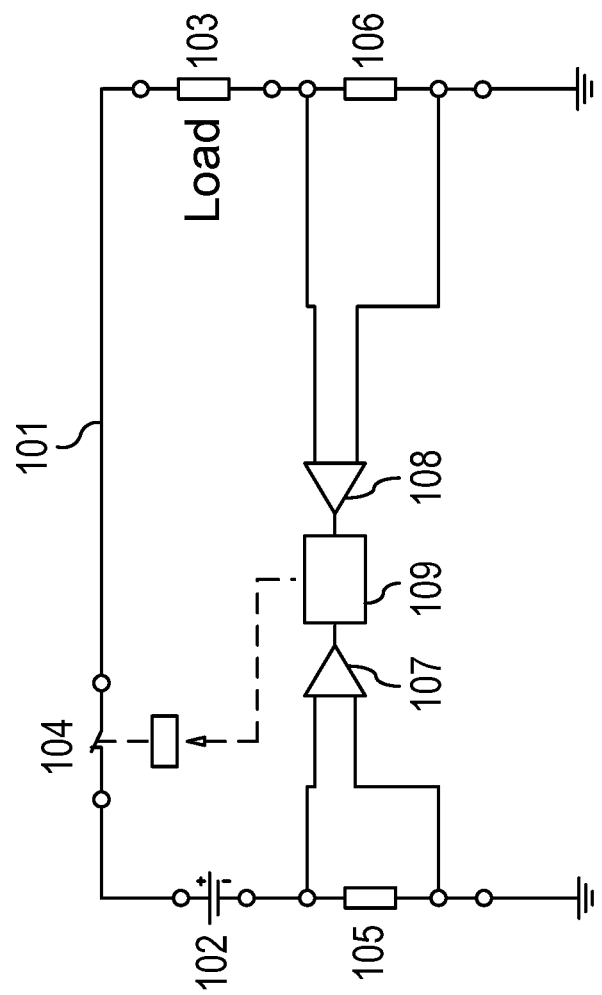
FIG. 1 shows a schematic circuit diagram for a differential current measurement at two locations on a line.

FIG. 1 shows a schematic circuit diagram for a differential current measurement in two locations on a line 101.

The line 101 connects a battery 102 to a load 103 via an isolating element 104. A measuring shunt 105 may be arranged at a first location in the line 101, and a measuring shunt 106 may be arranged at a second location. The measuring shunts 105 and 106 may also be referred to as shunt resistors. A voltage drop at the measuring shunt 105 (which may be proportional to a current 11 through the measuring shunt 105) may be sent to an evaluation unit 109 via an amplifier 107. A voltage drop across the measuring shunt 106 (which may be proportional to a current 12 through the measuring shunt 106) may be sent to the evaluation unit 109 via an amplifier 108. The voltage drops across the measuring shunts 105 and 106 (and therefore also those currents through the measuring shunts 105 and 106) may be compared with one another by the evaluation unit 109, and the isolating element 104 may be opened by the evaluation unit 109 as a function of the result of the comparison, so that the battery 102 is isolated from the load 103.

Therefore, parallel arcs can be detected in this way. For example, an arc current in the case of a parallel arc may be greater than 5 A. If the current difference between the currents 11 and 12 is greater than 5 A, then there may be a parallel arc or a short circuit. The isolating element 104 may then be opened by the evaluation unit 109, therefore interrupting the current flow from the battery 102 to the load 103.

It should be pointed out here that the battery may be any electric power source, such as an on-board electric system for a motor vehicle, for example. The load may be a consumer, for example a control unit or an actuator in the vehicle.

Figure 2:
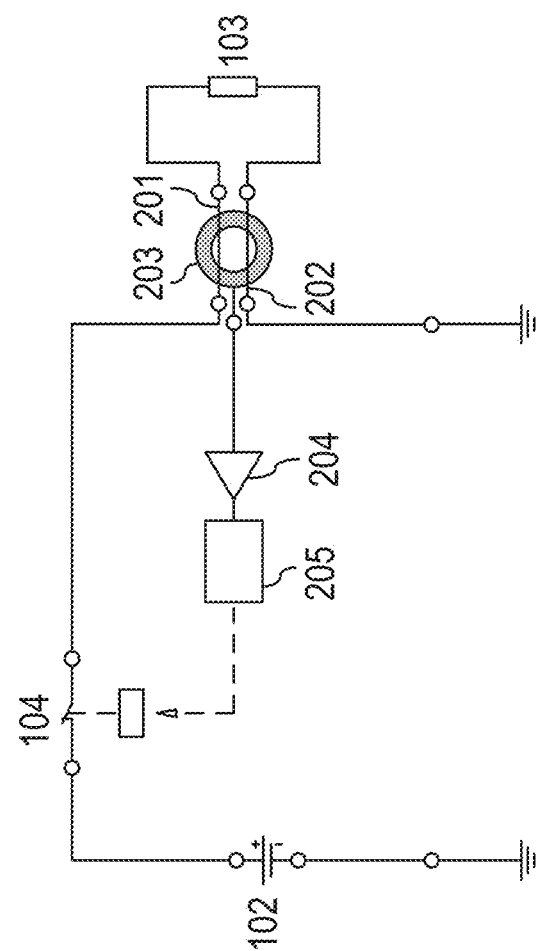
FIG. 2 shows a schematic circuit diagram for a differential current measurement using a Hall sensor.

FIG. 2 shows a schematic circuit diagram of the differential current measurement using a Hall sensor 203.

Again, a line may connect the battery 102 to the load 103 via the isolating element 104. The line may comprise a line section 201, which may be a power supply line, to the load 103, and a line section 202, which may be a ground line, from the load. A magnetic field of the line sections 201 and 202 may be detected by the Hall sensor 203 and the resulting Hall voltage may be sent via an amplifier 204 to an evaluation unit 205.

If a Hall sensor 203 has a current flowing through it and is brought into a magnetic field running perpendicular to the current, it may supply an output voltage proportional to the product of the magnetic field strength and the current, which may be a Hall effect. In this example, a separate power supply may be provided for the Hall sensor 203, which may be brought into the magnetic field of the conductor, here, the line sections 201 and 202.

For example, the magnetic fields of the two line sections 201 and 202, through which the same current is flowing in opposite directions, may be isolated almost completely, so that the Hall sensor outputs almost no signal.

In the case of a parallel arc a portion of the current may flow to ground via the arc. The difference in the current through the line section 201 and the current through the line section 202 may lead to a magnetic field that can be detected by the Hall sensor 203 and therefore to a signal voltage (Hall voltage) output by the Hall sensor 203. This change in the Hall signal voltage may be utilized as a fault signal by the evaluation unit 205 to open the isolating element 104 and to interrupt the current flow from the battery 102 to the load 103.

Figure 3:
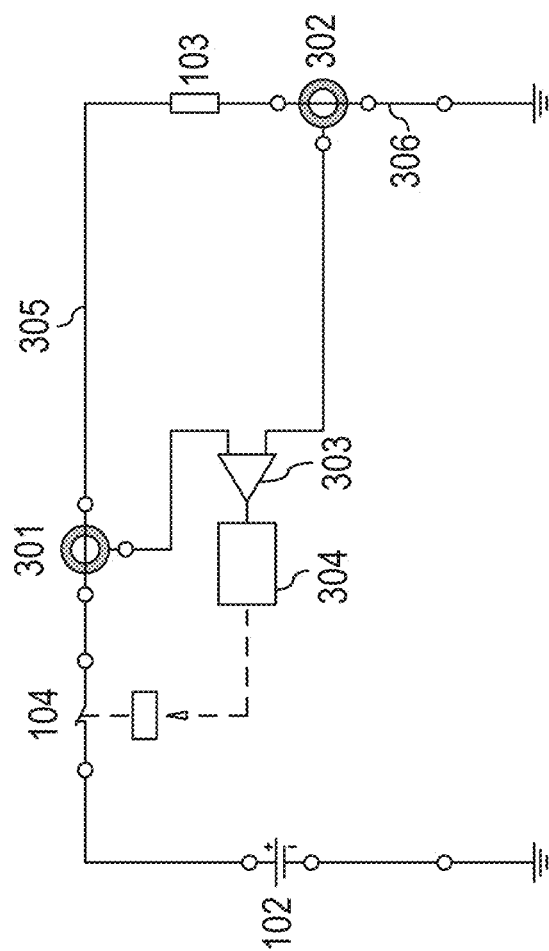
FIG. 3 shows an alternative circuit diagram for a differential current measurement using two Hall sensors.

FIG. 3 shows an alternative circuit diagram for the differential current measurement using two Hall sensors 301 and 302.

The Hall sensor 301 may be placed in a line section 305, which may be a power supply line, between the battery 102 and the load 103, and the Hall sensor 302 may be placed in a line section 306, which may be a ground line, between the load 103 and ground.

The Hall sensor 301 may supply a Hall voltage to the first input of an amplifier 303, which may be a comparator, and the Hall sensor 302 may supply a high voltage to the second input of the amplifier 303. The output of the amplifier 303 may be connected to an evaluation unit 304.

The evaluation unit 304 can determine, for example on the basis of at least one threshold value comparison, whether the current detected by the Hall sensor 301 deviates from the current detected by the Hall sensor 302 by more than a predefined value and can, if necessary, open the isolating element 104 to interrupt the current flow between the battery 102 and the load 103.

According to the diagram shown in FIG. 3, it is therefore possible to also monitor the feeder lines to the load 103 by appropriate positioning of the Hall sensors.

It is possible that a plurality of sensors, such as Hall sensors, for example, may be provided at different locations in a system, such as a motor vehicle for example. A measured signal may be output to the evaluation unit, for example, via an amplifier, and the evaluation unit may perform a comparison with other measured signals or threshold values to determine whether there is a fault. In the event of a fault, the isolating element 104 may be opened as shown in the figure, for example.

Figure 4:
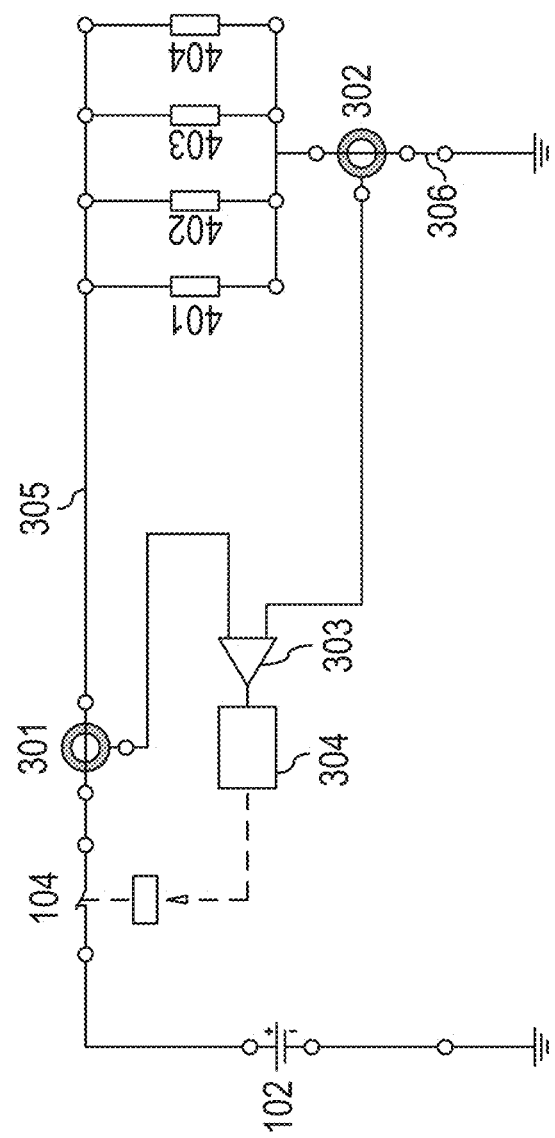
FIG. 4 shows a circuit diagram for a differential current measurement using two Hall sensors based on the diagram of FIG. 3, wherein, instead of the load, multiple loads are connected in parallel.

FIG. 4 shows a circuit diagram for the differential current measurement using two Hall sensors 301 and 302, based on the diagram in FIG. 3, wherein, instead of the load 103, a plurality of loads 401 to 404 are connected in parallel.

Accordingly, a sum signal to the loads 401 to 404 may be compared with a sum signal from the loads 401 to 404 to ascertain whether a fault case, such as a parallel arc for example, has occurred and the isolating element 104 may be opened accordingly.

Therefore, using the difference in the currents through the feeder lines 305 and 306, it is possible to reliably ascertain a short circuit within the group of loads 401 to 404 and therefore also to monitor the feeder line.

This approach may be advantageous when the loads 401 to 404 are difficult or impossible to differentiate. This approach may also be advantageous if the loads 401 to 404 can be provided with sensors individually only at great expense.

An imbalance between a current input into a line and a current output from the line can be determined by means of a measuring bridge. The respective current may be detected on the basis of the magnetic field surrounding the conductor. A GMR sensor or a Hall sensor, for example, may be suitable for such a current determination.

Figure 5:
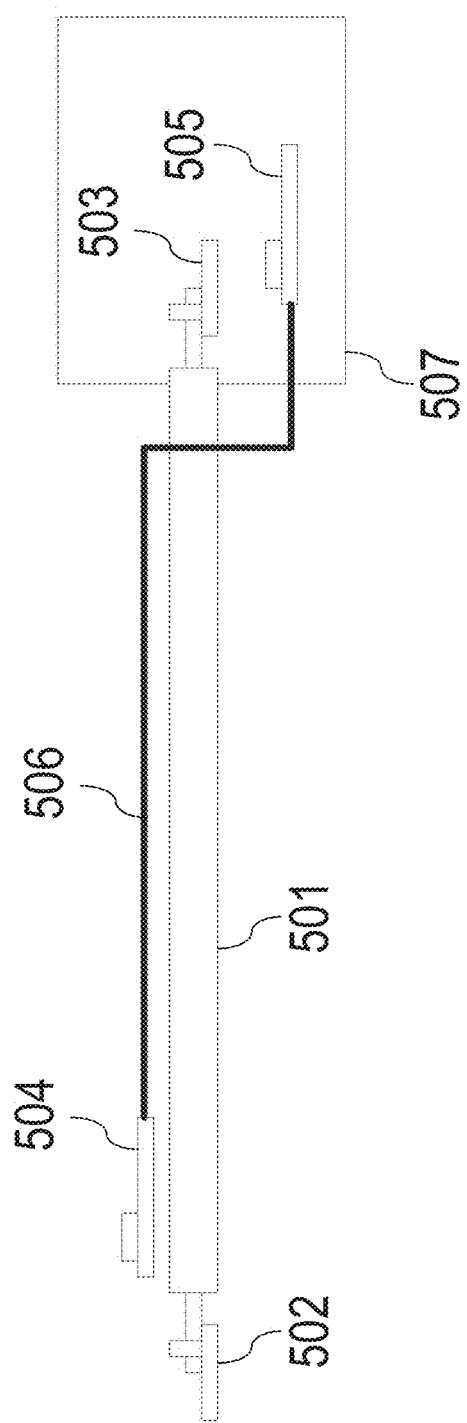
FIG. 5 shows a power supply line to be secured having two contacts, wherein a sensor device is arranged on or near each of the contacts as an example.

FIG. 5 shows a power supply line 501, which may be a feeder line, to be secured, having two contacts 502 and 503, with one sensor device 504, and another sensor device 505 being arranged on or in the vicinity of each of the contacts 502 and 503, for example. The sensor devices 504 and 505 may be interconnected via a dual-core line 506 (which may be a "twisted-pair" line, for example). The sensor devices 504 and 505 may optionally have a connection relating to their electric power supply.

For example, the sensor device 504 may be permanently or detachably connected to the power supply line 501 and/or to the contact 502. Another option may be for the sensor device 505 together with the contact 503 to be arranged in a current distributor 507. Also, the current distributor 507 may have an evaluation unit.

Therefore, the magnetic field or B field, which may be based on the current flow through the power supply line 501, may be measured by means of the respective sensor device 504 and 505. Such a B field measurement, which may be a current measurement, may be performed on or in the vicinity of the contacts 502 and 503, for example, at opposite points on the power supply line 501 to be monitored. Hall sensors with a magnetic circuit or GMR sensors may be used to measure the B field. A closed magnetic circuit may not be necessary in the case of GMR sensors.

In the case of a parallel arc, a portion of the current may flow to ground over the arc and may detune the bridge circuit with the GMR elements. Such detuning can be detected by means of the evaluation unit, and the isolating element may be opened and the power supply interrupted as a result.

Figure 8:
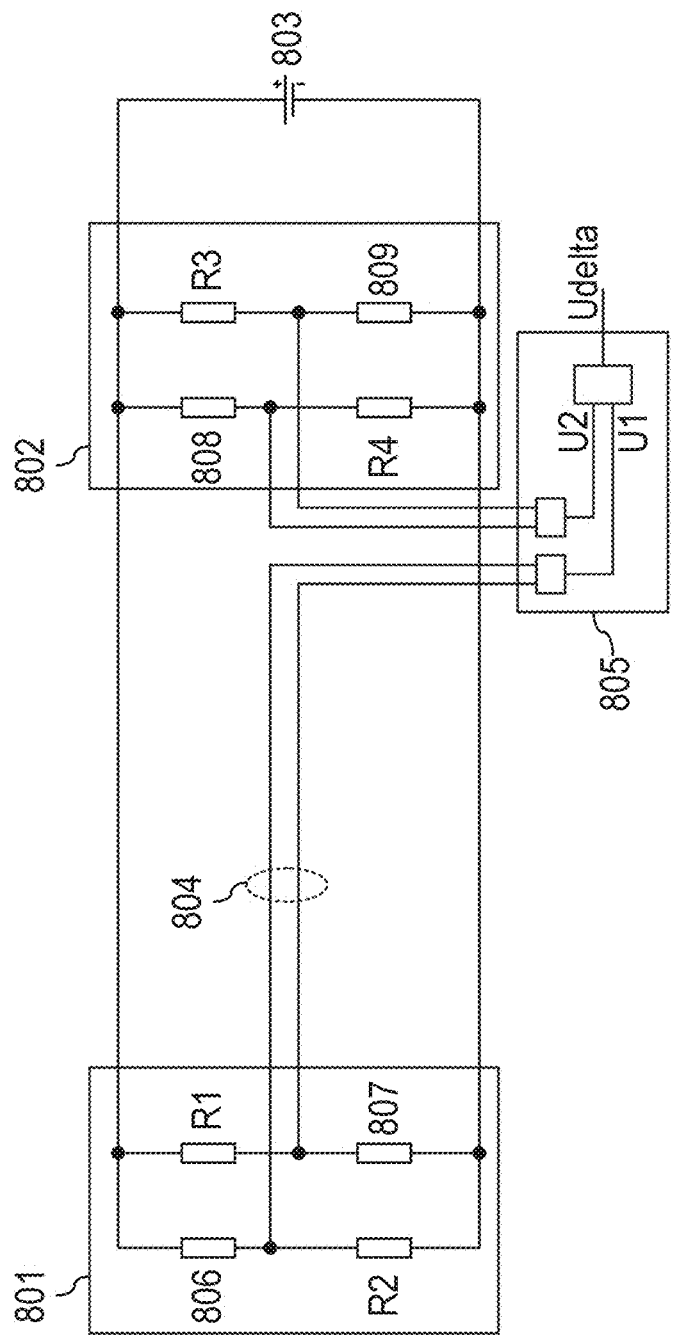
FIG. 8 shows a circuit diagram comprising two sensor devices, which are embodied as GMR full bridges and are arranged on both ends of a power supply line to be monitored.

FIG. 8 shows a circuit diagram comprising a sensor device 801, which may be embodied as a GMR full bridge, and a sensor device 802, which may also embodied as a GMR full bridge. Both sensor devices 801 and 802 may be connected to a power supply 803. The center taps of the sensor device 801 may be connected to an evaluation unit 805 via a twisted dual-core line 804. The center taps of the sensor device 802 may also connected to the evaluation unit 805.

Each of the full bridges may have a parallel circuit of two strands, wherein each strand may have a series circuit of a GMR element and a resistor. In the example embodiment, the strands may be in an anti-parallel arrangement, where each node of the parallel circuit may be connected to a GMR element of the one strand and to a resistor of the other strand.

The sensor device 801 may have the GMR elements 806 and 807, and the resistors R1 and R2 accordingly. The sensor device 802 may have the GMR elements 808 and 809, and the resistors R3 and R4 accordingly.

The evaluation unit 805 may determine a differential voltage U1 between the voltages on the center taps of the full bridge of the sensor device 801 and a differential voltage U2 between the voltages on the center taps of the full bridge of the sensor device 802. The evaluation unit may supply a differential voltage Udelta according to $$U\text{delta}=|U2-U1|.$$

The sensor devices 801 and 802 can be placed at different locations on a line, as described above. According to the example shown in FIG. 8, four cores in total, parallel to the line, may be required (two cores for the power supply of the sensor device 801 and two cores for supplying the voltages at the center taps of the full bridge).

This embodiment may be advantageous when both sensor devices 801 and 802 can be supplied with power from the system voltage 803 and therefore the voltage drop over the line may be additionally detected.

A serial arc can also be detected on the basis of the voltages on the center taps of the full bridges of the sensor devices 801 and 802.

The two sensor devices 801 and 802 may be arranged opposite one another and can advantageously be integrated on or in the vicinity of the line to be monitored, based on their electric variable. The effect of possible interference may be reduced due to the twisted dual-core line 804.

The line may be combined with existing plug systems. The sensor device 802 may be arranged together with the evaluation unit 805 in a current distributor.

This example embodiment may permit a flexible and efficient means of securing a sum current line.

Figure 9:
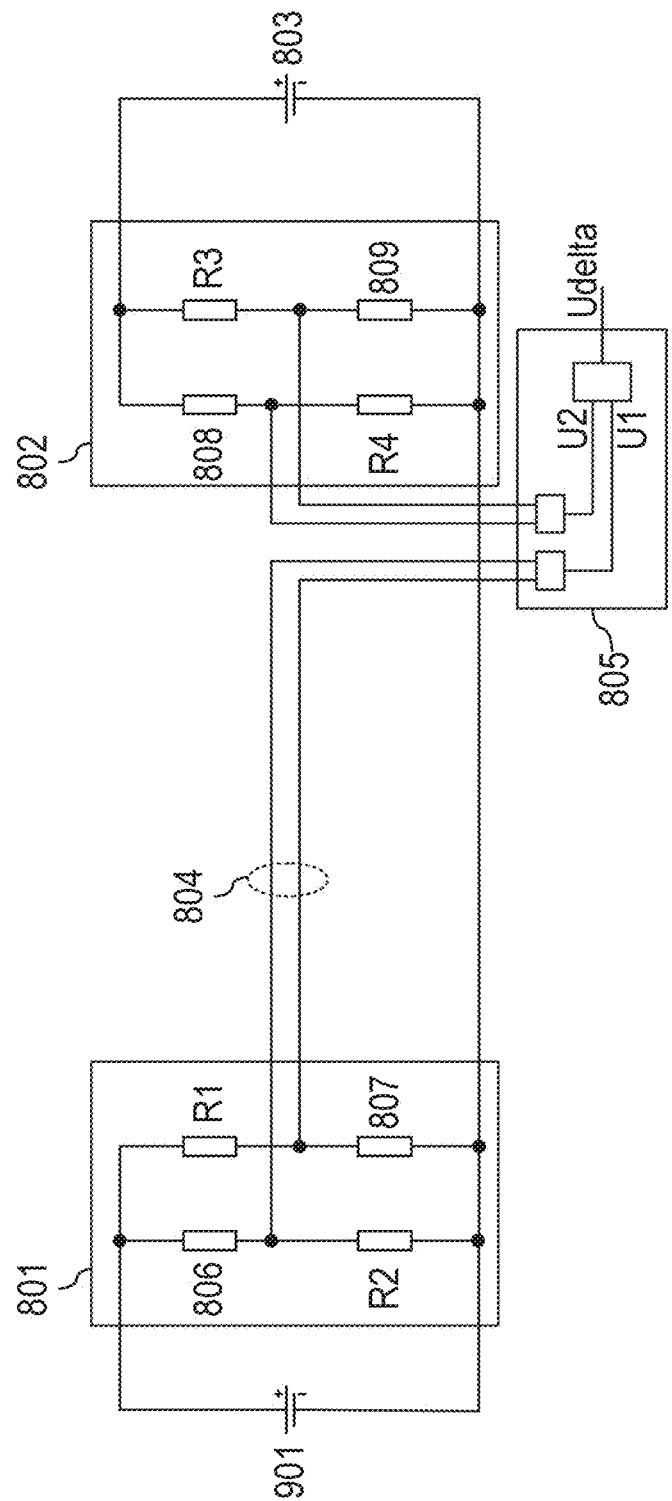
FIG. 9 shows a circuit diagram based on FIG. 8 having two power supplies for the two sensor devices.

FIG. 9 shows a circuit diagram based on FIG. 8, wherein a power supply voltage 901 is additionally provided for the sensor device 801. Therefore, one core may be omitted and the power supply voltages 901 and 803 depend on a common ground line.

Figure 6:
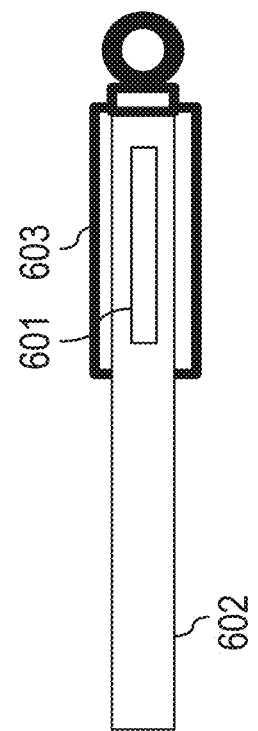
FIG. 6 shows a sensor device, which is connected to a cable with a terminal end.

FIG. 6 shows a sensor device 601, which may be arranged on a circuit board or a flexible circuit board, for example, and may be connected to a cable with a terminal end 602. The sensor device 601 may be surrounded by a shrink tubing 603.

Figure 7:
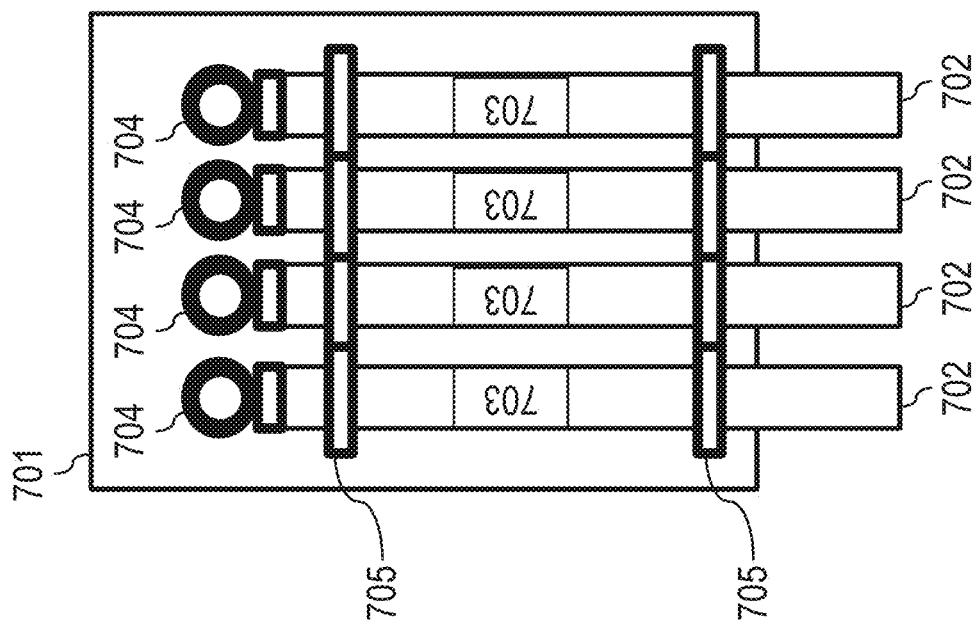
FIG. 7 shows a current distributor having a plurality of cables, each cable being detachably connected to the current distributor by means of a screw assembly, and each cable having a sensor device directly on the cable.

FIG. 7 shows a current distributor 701 with a plurality of cables 702, wherein each of the cables 702 may be detachably connected to the current distributor 701 by means of a screw connection 704, and each cable 702 may have a sensor device 703 directly on the cable. The cable 702 can be secured by means of line fixation devices 705.

The sensor devices may also be arranged directly beneath the lines on a shared circuit board. For example, a receptacle for the lines may be provided, which may determine a defined positioning of the respective line on the sensor device. The evaluation unit for the sensor devices may be arranged on the circuit board.

According the above example embodiment, it may be advantageous that only a small installation space is required for the sensor device. Mechanical fastening parts for the sensor device may also be obsolete.

The explanations provided with reference to the figures are merely illustrative and shall not be understood to have any limiting effect. It is possible to make various modifications to the described embodiments without departing from the scope of protection as it is defined in the accompanying claims.

LIST OF REFERENCE NUMERALS

101 line
102 battery
103 load
104 isolating element
105 measuring shunt
106 measuring shunt
107 amplifier
108 amplifier
109 evaluation
201 power section
202 power section
203 Hall sensor
204 amplifier
205 evaluation unit
301 Hall sensor
302 Hall sensor
303 amplifier
304 evaluation unit
305 power section
306 power section
401 load
402 load
403 load
404 load
501 power supply line 502 contact of the power supply line 501
503 contact of the power supply line 501
504 sensor device
505 sensor device
506 dual-core line
507 current distributor
601 sensor device
602 terminal end
603 shrink tubing
701 current distributor
702 cable
703 sensor device
704 screw connection
705 line fixation
801 sensor device
802 sensor device
803 battery
804 dual-core line
805 evaluation unit
806 GMR element (GMR sensor)
807 GMR element (GMR sensor)
808 GMR element (GMR sensor)
809 GMR element (GMR sensor)
R1 resistor
R2 resistor
R3 resistor
R4 resistor
901 battery

The invention claimed is:

1. A device for fuse protection of an electrical conductor line, comprising:
at least two sensors for sensing a corresponding electric variable in a first location and a second location along the conductor line and for outputting a corresponding first value and second value of the electric variable at the first and second locations, respectively; and
an evaluation unit that compares a difference between the generated first and second values to generate a first comparison result, and compares the first comparison result with a predefined threshold value to generate an evaluation result, wherein the evaluation unit controls, based on the evaluation result, an isolating element to cause the isolating element to interrupt a current flow in the conductor line.

2. The device according to claim 1, wherein the conductor line is a power supply line between a battery and at least one load.

3. The device according to claim 1, wherein the first and second locations are located proximate to a connection to a load.

4. The device according to claim 1, wherein at least one sensor includes a resistor connected to the conductor line, and wherein a voltage on the resistor is evaluated by the evaluation unit.

5. The device according to claim 4, wherein the resistor is a series resistor.

6. The device according to claim 1, wherein at least one sensor includes a Hall sensor, and wherein a Hall voltage is evaluated by the evaluation unit.

7. The device according to claim 1, wherein at least one sensor includes at least one giant magnetoresistance (GMR) sensor.

8. The device according to claim 7, wherein the at least one sensor includes a bridge circuit having at least one GMR sensor, wherein the bridge circuit further includes a full bridge circuit having two GMR sensors.

9. The device according to claim 1, wherein at least one sensor is mechanically connected to the conductor line.

10. The device according to claim 1, wherein the electric variable is a voltage, a current, or a power, or is based on a magnetic variable.

11. The device according to claim 1, wherein one sensor is coupled to a power supply line and one sensor is coupled to a ground line.

12. A method for fuse protection of an electrical conductor line, comprising:
sensing, with at least two sensors, a first value and second value, respectively, of an electric variable in a respective first location and second location along the conductor line;
comparing the sensed first and second values with one another to generate a first comparison result;
comparing the first comparison result with a predefined threshold value to generate an evaluation result; and
controlling an isolating element based on the evaluation result to interrupt a current flow in the conductor line.

13. The method according to claim 12, wherein the isolating element is opened if the first comparison result is greater than the predefined threshold value.

14. The method according to claim 12, wherein the isolating element is opened if the first comparison result is smaller than the predefined threshold value.

15. The method according to claim 12, wherein the evaluation result is determined based on chronologically successive first and second values of the electric variable.

* * * * *